(12) United States Patent
Ford

(10) Patent No.: US 8,061,381 B2
(45) Date of Patent: Nov. 22, 2011

(54) SUCKER ROD PUMP WITH IMPROVED BALL AND SEAT

(76) Inventor: Michael Ford, St. George, UT (US)

(*) Notice: Subject to any disclaimer, the term of this patent is extended or adjusted under 35 U.S.C. 154(b) by 826 days.

(21) Appl. No.: 11/668,724

(22) Filed: Jan. 30, 2007

(65) Prior Publication Data

US 2008/0179560 A1    Jul. 31, 2008

(51) Int. Cl.
*F16K 15/00* (2006.01)
*F16K 17/00* (2006.01)
*F16K 21/04* (2006.01)

(52) U.S. Cl. ........... 137/515.7; 137/533.11; 137/533.15; 417/554

(58) Field of Classification Search .................. 417/554, 417/555.2; 137/515.7, 533.11, 533.15; 251/315.01
See application file for complete search history.

(56) References Cited

U.S. PATENT DOCUMENTS

| | | | | |
|---|---|---|---|---|
| 1,074,191 A | * | 9/1913 | Mixer | 137/533.13 |
| 1,757,139 A | * | 5/1930 | Platenberg | 137/533.13 |
| 3,620,653 A | * | 11/1971 | Gaylord et al. | 417/568 |
| 3,724,496 A | * | 4/1973 | Secrist | 137/533.13 |
| 4,513,778 A | * | 4/1985 | Vadasz | 137/533.11 |
| 4,662,392 A | * | 5/1987 | Vadasz | 137/533.11 |
| 5,183,068 A | * | 2/1993 | Prosser | 137/1 |
| 5,249,936 A | * | 10/1993 | McConnell et al. | 417/444 |
| 5,297,580 A | * | 3/1994 | Thurman | 137/533.15 |
| 5,507,312 A | * | 4/1996 | Dillman | 137/533.15 |
| 5,593,289 A | * | 1/1997 | Tarpley | 417/454 |
| 5,749,394 A | * | 5/1998 | Boehmer et al. | 137/533.15 |
| 6,105,610 A | * | 8/2000 | Watkins et al. | 137/516.29 |
| 6,199,636 B1 | * | 3/2001 | Harrison | 166/328 |

\* cited by examiner

*Primary Examiner* — Devon C Kramer
*Assistant Examiner* — Peter J Bertheaud
(74) *Attorney, Agent, or Firm* — Jeffrey L. Weiss; Karen J. S. Fouts; Weiss & Moy, P.C.

(57) ABSTRACT

There is provided a seat assembly for use in a downhole oil pump ball valve. The assembly includes a seat, a seat rest, and a ball. The seat is used for seating the ball of the ball valve. The seat has an outer wall and a top surface and a curved shoulder surface between the outer wall and the top surface. The seat rest receives the seat, and the seat rest has a curved corner surface so that when the seat is assembled with the seat rest the seat and seat rest are in substantial contact at all points of the curved shoulder surface and the curved corner surface.

10 Claims, 2 Drawing Sheets

SUCKER ROD PUMP WITH IMPROVED BALL AND SEAT

FIELD OF THE INVENTION

The present invention relates to mechanical oil pumps actuated by sucker rod reciprocation. More particularly, the invention relates to the directional control of oil flow through the oil pump and to the positioning of ball and seat components within the oil pump.

BACKGROUND OF THE INVENTION

As the natural pressure in a completed oil well gradually depletes, the well may require a means known as artificial lift to continue the flow of petroleum reserves from their subterranean location to the earth's surface. Various forms of artificial lift are known including, for example, gas injection, water injection, and mechanical pumping. Petroleum engineers select a form of artificial lift depending on a number of criteria including, for example, formation geology and economics. The sucker rod pump is a well-known kind of mechanical pump that is widely used in the petroleum industry.

The sucker rod pumping system typically includes a means of providing a reciprocating (up and down) mechanical motion located at the surface near the well head. A string of sucker rods—up to more than a mile in length—is connected to the mechanical means. The sucker rod string is fed through the well tubing down hole where it is connected to the pump.

As is generally known in the art, a sucker rod pump includes at least two separate valves as well as other pump components such as a barrel, plunger, and anchor. Beginning at the south end, oil pumps generally include a standing valve, which has a ball therein, the purpose of which is to regulate the passage of oil (or other substance being pumped) from downhole into the pump, allowing the pumped matter to be moved northward out of the system and into the flow line, while preventing the pumped matter from dropping back southward into the hole. Oil is permitted to pass through the standing valve and into the pump by the movement of the ball off its seat, and oil is prevented from dropping back into the hole by the seating of the ball. North of the standing valve, coupled to the sucker rod, is a traveling valve. The purpose of the traveling valve is to regulate the passage of oil from within the pump northward in the direction of the flow line, while preventing the pumped oil from dropping back in the direction of the standing valve and hole.

Actual movement of the pumped substance through the system will now be discussed. Oil is pumped from a hole through a series of "downstrokes" and "upstrokes" of the oil pump, which motion is imparted by the above-ground pumping unit. During the upstroke, formation pressure causes the ball in the standing valve to move upward, allowing the oil to pass through the standing valve and into the barrel of the oil pump. This oil will be held in place between the standing valve and the traveling valve. In the traveling valve, the ball is located in the seated position, held there by the pressure from the oil that has been previously pumped.

On the downstroke, the ball in the traveling valve unseats, permitting the oil that has passed through the standing valve to pass therethrough. Also during the downstroke, the ball in the standing valve seats, preventing pumped oil from moving back down into the hole. The process repeats itself again and again, with oil essentially being moved in stages from the hole, to above the standing valve and in the oil pump, to above the traveling valve and out of the oil pump. As the oil pump fills, the oil passes through the pump and into the tubing. As the tubing is filled, the oil passes into the flow line, from which oil is taken to a storage tank or other such structure.

Presently known designs of sucker rod pumps suffer from several shortcomings in various areas of the design. The ball and seat components used in both the traveling valve and the standing valve are exposed to wear. The seat components are also subject to high pressures, particularly in deep wells, which can lead to cracking. Hence, it would be desired to develop sucker rod pumps having valves that display improved wear and cracking resistance.

SUMMARY OF THE INVENTION

In one embodiment, and by way of example only, there is provided a seat assembly for use in a downhole oil pump ball valve. The assembly includes a seat, a seat rest, and a ball. The seat is used for seating the ball of the ball valve. The seat has an outer wall and a top surface and a curved shoulder surface between the outer wall and the top surface. The seat rest receives the seat, and the seat rest has a curved corner surface so that when the seat is assembled with the seat rest the seat and seat rest are in substantial contact at all points of the curved shoulder surface and the curved corner surface.

Other independent features and advantages of the sucker rod pump with improved ball and seat will become apparent from the following detailed description, taken in conjunction with the accompanying drawings which illustrate, by way of example, the principles of the invention.

DETAILED DESCRIPTION OF A PREFERRED EMBODIMENT

The following detailed description of the invention is merely exemplary in nature and is not intended to limit the invention or the application and uses of the invention. Furthermore, there is no intention to be bound by any theory presented in the preceding background of the invention or the following detailed description of the invention. Reference will now be made in detail to exemplary embodiments of the invention, examples of which are illustrated in the accompanying drawings. Wherever possible, the same reference numbers will be used throughout the drawings to refer to the same or like parts.

In a first aspect of the invention, it has been found that downhole sucker rod pumps can be improved by reconfiguring the current API ball and seat valve design. Wells continue to be drilled to deeper and deeper depths. It is not unusual for new wells to exceed 10,000 feet in depth. At such depths tremendous loads are set up on downhole equipment, including sucker rod pumps. For example, when ball valves are used, as is very often the case in sucker rod pumps, the down hole pressure in a deep well presses the ball against the ball seat at very high pressures. These pressures necessitate the use of brittle materials that are subject to cracking. Cracking of the ball seat often occurs after repeated pounding of the ball against the seat at high pressures. Cracking is further promoted by seat spread, the force of the ball against the seat tending to move the seat in a lateral direction. However, valve seat cracking in a deep well is undesirable in that it is expensive to pull a pump out from great depth. The present invention overcomes this problem.

Figures 1, 2:
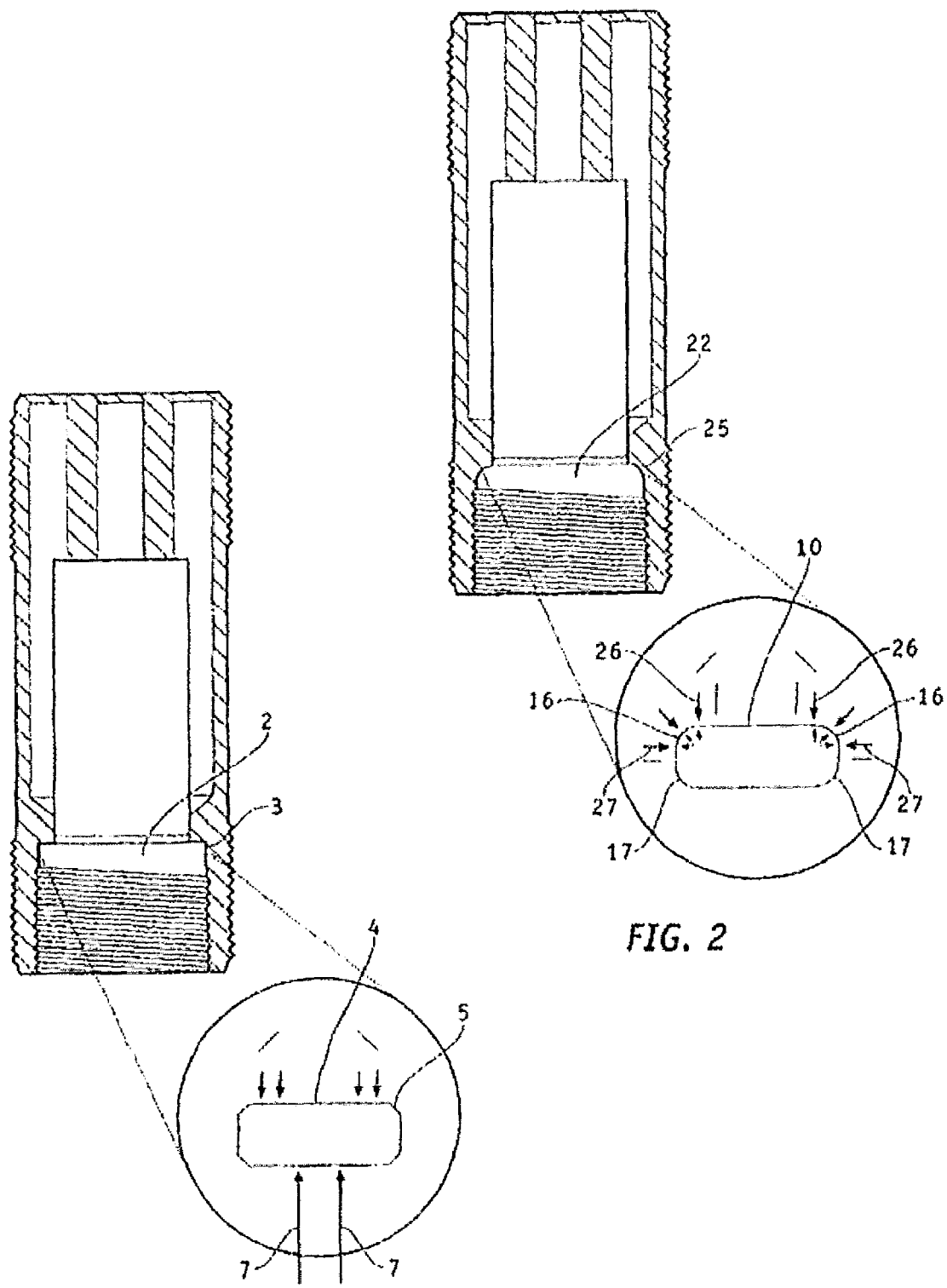
FIG. 1 is a cut away view of a prior art ball valve.
FIG. 2 is a cut away view of ball valve, according to an embodiment of the present invention.

Referring now to FIG. 1 there is illustrated the current American Petroleum Institute (API) approved design for a seat to be used with a sucker rod ball valve. Such a valve may be used, for example as a standing valve, a traveling valve, or other such valve in the pump apparatus. In FIG. 1, the seat rest 2 is square in profile, illustrated by corner 3. The seat 4, positioned against seat rest 2, is similarly square in profile, or it may be chamfered as illustrated. When chamfered, for example, the seat corner 5 does not contact housing corner 3. A seat plug (not shown in FIG. 1) is used to fix seat 4 in place with respect to seat rest 2. This prior art arrangement allows seat 4 to be held in place through vertical forces, shown by arrows 7, of the seat plug pressing the seat 4 into the seat rest. This arrangement does not allow for lateral forces, arrow 8. The terms vertical and lateral are used herein though it will be understood that this may not align with the vertical of the surrounding environment.

Figure 3:
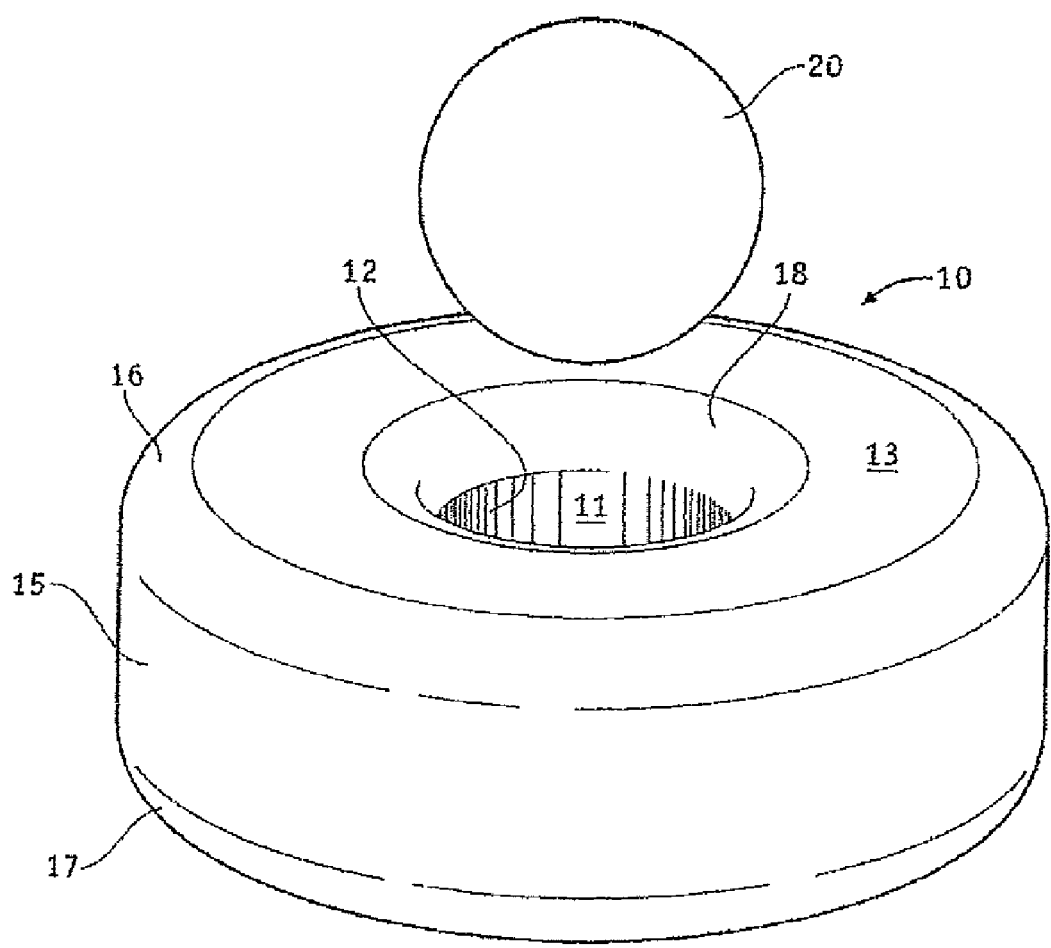
FIG. 3 is a perspective view of a ball valve seat, according to an embodiment of the present invention.

Referring now to FIG. 3 there is illustrated an exemplary embodiment of a new valve seat 10. It is noted that valve seat 10 is generally a hollow cylinder in shape. Valve seat 10 includes central aperture 11 defined by aperture wall 12. In addition valve seat includes a top surface 13, bottom surface (not shown), and outer wall 15. The juncture of outer wall 15 and top surface 13 define a top shoulder surface 16. Additionally the juncture of outer wall 15 and bottom surface (not shown) define a bottom shoulder surface 17. The top shoulder surface 16 and bottom shoulder surface 17 may be radiuses of a circle. In a preferred embodiment, top surface 13 and bottom surface (not shown) are mirror images of each other, as are top shoulder 16 and bottom shoulder 17. Thus the references to top and bottom are for convenience of description. Valve seat 10 can be fabricated from a variety of materials commonly used in downhole petroleum applications including, by way of example only, high strength steel alloys, carbon steel, tungsten carbide, ceramic, and nickel carbide. An exemplary ball 20 that functions with seat 10 is also shown in FIG. 3.

FIG. 2 further illustrates the new valve design showing both the seat 10 and seat rest 22. Seat rest 22 has a curved surface 25 which corresponds to a curved corner of the seat rest. Curved surface 25 is formed so as to reciprocally match the curved shoulder surface 16 of seat 10. In one embodiment curved surface 25 defines a radius of a circle. Seat rest 22 may be formed as part of the housing or structure of a traveling valve or standing valve. A seat plug may be reciprocally threaded with the seat rest 22 in order to allow seat plug to press seat 10 against seat rest 22.

Comparing the valve designs in FIG. 1 and FIG. 2 reveals that both the seat design is different and the seat rest design is different. In the present invention, the seat 10 and seat rest 22 have curved (radiused) corners—unlike the current API technology, which calls for the seat in a ball valve to have a shoulder that is square (90° wall-to-wall) in profile. A square shoulder has an aperture wall and top wall that are positioned approximately at right angles, and meet at a point. In contrast, the valve seat 10 of the present invention has a rounded shoulder 25. The API design offers no lateral support, while the new seat 10 and seat rest 22 do.

The advantage of the radiused seat design appears when the seat 10 and seat rest 22 are assembled. The seat plug is forced against the seat 10 at some pressure, for example, 200-300 lbs, torque. This pressure causes a preloading of the seat 10 against the seat rest 22. This means that as the seat 10 is pressed against the seat rest 22, the radiused shoulder 16 of the seat 10 contacts the radiused corner 25 of the seat rest 22—in addition, the top surface 13 of seat 10 also contacts the matching surface of seat rest 22. As shown in FIG. 2, forces that press seat 10 against seat rest 22 are extended not just vertically (shown by arrow 26), but also at all points of the radius extending to a lateral direction (arrow 27). The forces on seat 10 are met and resisted by equal forces coming from the housing/seat rest 22. The seat 10 is now in the preloaded condition, i.e., the seat 10 has forces both vertical and lateral (and continuously in between) acting on it along the points of contact at the matched curved surfaces.

In operation, this preloading of forces allows seat 10 to better resist forces that try to crack the seat 10. During operation of the valve a ball (shown as 20 in FIG. 2) moves between an open position and a closed position; i.e. ball 20 comes into contact with seat 10 and moves away from seat 10. And, as previously mentioned, in deep holes the pressure that ball 20 exerts on seat 10 is considerable. For example, when ball 20 is forced into contact with seat 10, the force tends to spread the seat 10 in the lateral direction. However, with the new design, because the seat 10 is preloaded, there's a lateral force already in place against seat 10 which acts to resist the spreading force. By contrast, when the geometrical relationship between seat and seat rest is square, with the prior art API design, you can only get a vertical preloading on the face—not the lateral preloading. Furthermore, because the area of contact between seat 10 and seat rest 22 continues over a curve, the preloading forces are continuously distributed. Shear forces and force discontinuities acting on the seat 10 are minimized, which also assists in crack resistance.

By way of example, a seat according to an embodiment to the present invention has been fabricated and tested at pressures that are experienced in deep wells. A seat of tungsten carbide material was fabricated. The seat was created with a radiused shoulder as described herein. The seat was loaded against a seat with rest with a matching radiused shoulder. The seat and seat rest were preloaded with a force in excess of 200 lbs/in$^2$. The seat was then exposed to pressures in excess of deep well pressures. The seat was tested up to 20,000 psi pressure with no cracking. Other API seats have cracked at 5,000 lbs pressure.

In summary, the seat and seat rest combination of the present invention will offer performance advantages with respect to currently known designs. The deeper modern wells tend to pick up more deleterious materials, such as fine sands, that stress ball valve components. In addition the high pressures present in deep wells necessitate the use of brittle materials such as cobalt, stellite, nickel carbide, or tungsten carbide materials. These can be quite brittle. At 5000 lbs pressure, a seat of such material that experiences spreading forces from the ball has a tendency to crack. The present design assists in avoiding the cracking tendency.

The advantages associated with preloading the seat on a radiused shoulder are particularly advantageous in deep wells. When a seat cracks in a deep well, it is necessary to pull the pump in order to replace the seat. Pulling the pump in a deep well is expensive. Thus, the present invention helps to minimize the necessity of pulling the pump, and/or allows for scheduled maintenance intervals rather than unexpected and unscheduled maintenance.

Further, the improved ball and seat design disclosed herein has advantages when used with seats made of ceramic materials. Ceramic materials are generally characterized as more brittle than metal alloys typically used in downhole applications, and are also generally prone to cracking in the high pressure environments encountered in deep wells. The radiused seat embodiment, which generally resists cracking, is thus advantageous when used with ceramic materials.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A seat assembly for use in a ball valve comprising:
   a seat for seating the ball of the ball valve, the seat having:
      a flat outer wall;
      a flat top surface;
      a top curved shoulder surface positioned between the outer wall and the top surface, the top curved shoulder surface beginning at the top surface and continuing to the outer wall, the top curved shoulder surface comprising a circular radius;
      a flat bottom surface that is the mirror image of the top surface; and
      a bottom curved shoulder surface positioned between the outer wall and the bottom surface that is the mirror image of the top curved shoulder surface; and
   a seat rest configured to receive the seat in either a top surface up or a bottom surface up orientation, the seat rest having a matching surface corresponding to one of the top surface and bottom surface of the seat and having a curved corner surface so that when the seat is assembled with the seat rest the seat and seat rest are in substantial contact at all points from one of the top curved shoulder surface to the top surface and the bottom curved shoulder surface to the bottom surface, on the one hand, and from the curved corner surface to the matching surface, on the other.

2. The seat assembly according to claim 1 wherein both curved shoulder surfaces and the curved corner surface define substantially the same circular radius.

3. A ball valve comprising:
   a ball;
   a seat with an inner shoulder for receiving the ball, a flat outer wall, a flat top surface, and a top curved shoulder surface positioned between the outer wall and the top surface, the top curved shoulder surface beginning at the top surface and continuing to the outer wall, the top curved shoulder surface comprising a circular radius;
   a flat bottom surface that is the mirror image of the top surface, and a bottom curved shoulder surface positioned between the outer wall and the bottom surface that is the mirror image of the top curved shoulder surface; and
   a seat rest positioned upward of the seat and configured to hold the seat, wherein the seat rest has a matching surface corresponding to one of the top surface and bottom surface of the seat and a curved corner having a curved corner surface so that when the seat is assembled with the seat rest, with the seat in either a top surface up or a bottom surface up orientation, the seat and seat rest are in substantial contact at all points from one of the top curved shoulder surface to the top surface and the bottom curved shoulder surface to the bottom surface, on the one hand, and from the curved corner surface to the matching surface, on the other.

4. The ball valve according to claim 3 wherein the curved shoulder surface of the seat defines the circular radius and wherein the curved corner surface of the seat rest defines the same circular radius.

5. The ball valve according to claim 3 wherein there is a lateral preloading force between the seat and the seat rest.

6. The ball valve according to claim 5 wherein the lateral preloading force exceeds 100 lbs/in$^2$.

7. The ball valve according to claim 3 wherein the preloading force between the seat and the seat rest continuously extends from a substantially vertical alignment to a substantially lateral position.

8. The ball valve according to claim 5 wherein the ball causes a spreading force on the seat when the ball comes in contact with the seat, and wherein the preloading force between the seat and the seat rest resists the spreading force of the ball on the seat.

9. The ball valve according to claim 3 wherein the ball valve is part of a traveling valve in a sucker rod pump.

10. The ball valve according to claim 3 wherein the ball valve is part of a standing valve in a sucker rod pump.

* * * * *